May 5, 1925.
K. W. BARTLETT
1,536,060
LIQUID TREATING APPARATUS
Filed May 26, 1924
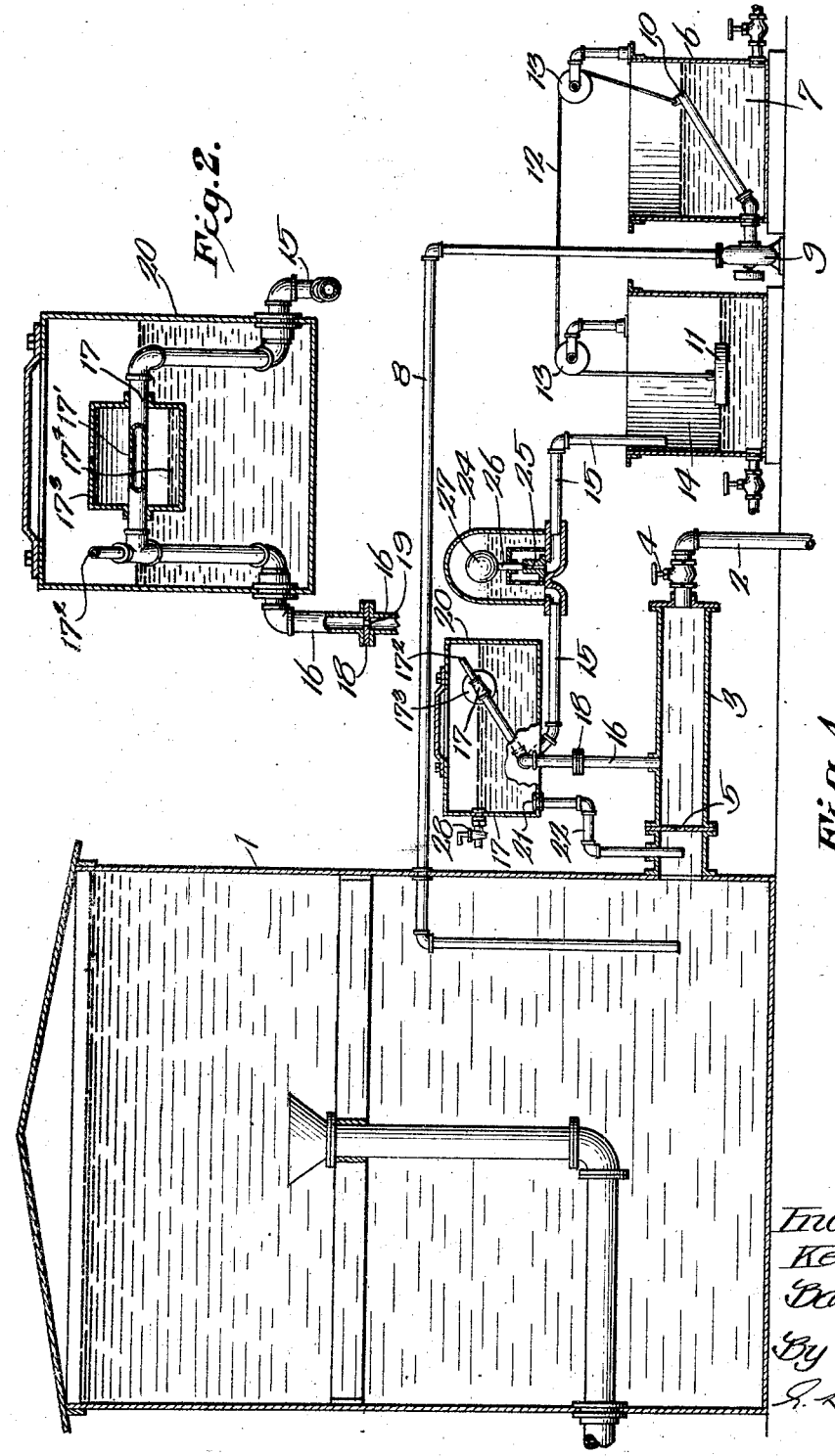
Inventor:
Kent W.
Bartlett Patented May 5, 1925.

1,536,060

UNITED STATES PATENT OFFICE.

KENT W. BARTLETT, OF HAMMOND, INDIANA.

LIQUID-TREATING APPARATUS.

Application filed May 26, 1924. Serial No. 715,995.

*To all whom it may concern:*

Be it known that I, KENT W. BARTLETT, a citizen of the United States, residing at Hammond, in the county of Lake and the State of Indiana, have invented a certain new and useful Improvement in Liquid-Treating Apparatus, of which the following is a full, clear, concise, and exact description.

My invention relates to liquid treating apparatus and is of particular service in softening water.

The invention has for its object the provision of improved means for controlling the mechanism which is employed for regulating the flow of chemical from the chemical source to the water that is to be softened or to the liquid that is to be treated.

In practicing my invention, piping is employed for supplying the water or other liquid that is to be treated to a settling or treatment tank, this piping having a constricted outlet discharging into the tank below its limiting level. A portion of the liquid flowing toward the treatment tank controls the mechanism which governs the flow of chemical, this controlling liquid flowing through an orifice which is small in comparison with the aforesaid constricted outlet. Means are further employed which enable the back pressure of the liquid in the tank impressed at said outlet to produce a like pressure which is impressed at said orifice, this means being inclusive of an atmospheric or other gaseous medium interposed between said orifice and the liquid within the tank and through which this liquid exerts its pressure. In the preferred embodiment of the invention, the means for regulating the pressure, as stated, includes a receptacle having an inlet communicating with said tank upon the discharge side of the outlet, and a second receptacle liquid conveying member adjustable in position by the liquid in the first and communicating with the first through a passage that is above said inlet, there being sealed space in both receptacles placed in communication by said passage, in which space air or gas is trapped to constitute the medium through which the liquid exerts its pressure. The apparatus of my present invention is of particular utility where the liquid level in the treatment tank varies within a wide range and prevents the variation in the head of this liquid from disturbing the equality of pressures at said outlet and orifice.

The invention will be more fully explained in connection with the accompanying drawing of which Fig. 1 is a view in section, somewhat diagrammatic, illustrating the preferred embodiment of the invention; and Fig. 2 is a cross sectional view of part of the apparatus.

The treatment or settling tank 1 receives the water or other liquid that is to be treated through incoming piping 2, having an enlargement 3 adjacent the piping and desirably having a cut off valve 4. The liquid is discharged into the tank through an outlet 5 which is desirably constricted with respect to the bores of the piping 2 and its enlargement 3, the liquid being admitted to the tank near the bottom thereof. A source of chemical is illustrated in the form of a chemical tank 6 which holds the chemical 7, such as $Ca(OH)_2$ and $Na_2CO_3$, where water is being softened. Chemical from the source of chemical is supplied into the treatment tank 1 through piping 8, whose discharge end is located near the incoming raw liquid. The chemical is forced through pipe 8 by means of a pump 9 into which the chemical flows through the swinging pipe 10, mounted in the chemical tank 6. The position of this swinging pipe is governed by a float 11 that is connected with the pipe by means of a cable 12 passing over sheaves 13. The float tank 14, which contains the float 11, receives the fractional portion of the liquid which governs the flow of chemical into the treatment tank, through piping 15, 16. The latter piping communicates with a liquid conveying member which is preferably the horizontal branch 17 of an inverted U shaped piping portion which has one end in swinging connection with the discharge end of piping 16 and its other end in swinging connection with the receiving end of piping 15. The latter piping communicates with the liquid conveying member 17. In the embodiment of the invention shown, the piping 16 receives liquid from the pipe portion 3 to be subject to the pressure of the water in this pipe portion. There is a partition 18 in piping 16, having a single orifice 19 which is small in comparison with the outlet opening 5. Liquid flowing through orifice 19 reaches pipe 15 through member 17.

In order that the back pressure impressed at the discharge side of the outlet 5 may be accompanied by a like pressure at the orifice 19, another, and preferably stationary member, a sealed receptacle or liquid receiving member 20 is employed which has an inlet 21 at its bottom through which liquid is admitted from the settling tank by way of piping 22. The liquid conveying member 17 and the U shaped piping including it are contained in the sealed receptacle 20, the adjacent ends of the piping 15, 16 passing through the walls of this receptacle. The liquid conveying member 17 has passages 17' and 17² communicating with the top of receptacle 20. The piping 15 has a trap 24 connected therein in which the controlling liquid is first admitted from the liquid conveying member 17 and from which the flow of this liquid issues from the trap 24 through a port 25 having a valve 26 which is governed by a float 27 riding upon the liquid in the trap. The apparatus included in and between the piping 15, 16 and 22 serves to produce or afford a pressure impressed at the orifice 19, which is equal to the back pressure impressed at the discharge side of the outlet 5, the air or gas trapped at the top of the elements 17 and 20 and the top of the trap 24 taking part in performing this function.

The liquid conveying member 17 is caused to rise and fall with the level of the water in receptacle 20, this level fluctuating in response to the variation of the volume of water in tank 1, such fluctuation being permitted by consequent change in the volume of air above the water in receptacle 20 due to the variation in the pressure that is consequent upon change in the head of water in tank 1. This rise and fall of liquid conveying member 17 is controlled by the water in receptacle 20 through the intermediation of a float 17³ which rides upon the water in receptacle 20 and which float carries receptacle 17. The position of float 17³ and the liquid conveying member 17 is adjusted and held fixed with respect to the fluctuating water level in receptacle 20 by means of a selected weight 17⁴, which may be mercury. An air vent valve 28 may be employed to establish communication with the external air in adjusting the apparatus for operation.

Changes may be made without departing from my invention.

Having thus described my invention, I claim:—

1. In a liquid treating apparatus, the combination with a tank for receiving liquid to be treated; piping for supplying liquid to be treated and having a constricted outlet discharging into the tank below its limiting level; a source of chemical in communication with said tank; liquid controlled mechanism for regulating the flow of chemical from said source to said tank; a liquid conveying member having an inlet communicating with the tank upon the discharge side of said outlet; a liquid conveying member mounted to rise and fall and communicating with the first member through a passage that is above said inlet; there being sealed gas holding space in each member placed in communication with the gas holding space in the other by said passage, there also being an orifice, small in comparison to said outlet, through which controlling liquid is discharged from said piping into the second member; means controlled by the liquid in the first member and connected with the second member substantially fixed with respect to the liquid level in the first member; and a trap receiving liquid from the second member and discharging the liquid to the liquid controlled mechanism to control the same.

2. In a liquid treating apparatus, the combination with a tank for receiving liquid to be treated; piping for supplying liquid to be treated and having a constricted outlet discharging into the tank below its limiting level; a source of chemical in communication with said tank; liquid controlled mechanism for regulating the flow of chemical from said source to said tank; a stationary liquid conveying member having an inlet communicating with the tank upon the discharge side of said outlet; a liquid conveying member mounted to rise and fall and communicating with the first member through a passage that is above said inlet, there being sealed gas holding space in each member placed in communication with the gas holding space in the other by said passage, there also being an orifice, small in comparison to said outlet, through which controlling liquid is discharged into the second member; means controlled by the liquid in the first member and connected with the second member substantially fixed with respect to the liquid level in the first member; and a trap receiving liquid from the second member and discharging the liquid to the liquid controlled mechanism to control the same.

3. In a liquid treating apparatus, the combination with a tank for receiving liquid to be treated; piping for supplying liquid to be treated and having a constricted outlet discharging into the tank below its limiting level; a source of chemical in communication with said tank; liquid controlled mechanism for regulating the flow of chemical from said source to said tank; a liquid conveying member having an inlet communicating with the tank upon the discharge side of said outlet; a liquid conveying member mounted to rise and fall and communicating with the first member through a passage that is above said inlet, there being sealed gas holding space in each member placed in communication with the gas holding space in the other by said passage, there also being an orifice, small in comparison to said outlet, through which controlling liquid is discharged from said piping into the second member; float mechanism controlled by the liquid in the first member and connected with the second member substantially fixed with respect to the liquid level in the first member; and a trap receiving liquid from the second member and discharging the liquid to the liquid controlled mechanism to control the same.

4. In a liquid treating apparatus, the combination with a tank for receiving liquid to be treated; piping for supplying liquid to be treated and having a constricted outlet discharging into the tank below its limiting level; a source of chemical in communication with said tank; liquid controlled mechanism for regulating the flow of chemical from said source to said tank; a stationary liquid conveying member having an inlet communicating with the tank upon the discharge side of said outlet; a liquid conveying member mounted to rise and fall and communicating with the first member through a passage that is above said inlet, there being sealed gas holding space in each member placed in communication with the gas holding space in the other by said passage, there also being an orifice, small in comparison to said outlet, through which controlling liquid is discharged into the second member; float mechanism controlled by the liquid in the first member and connected with the second member substantially fixed with respect to the liquid level in the first member; and a trap receiving liquid from the second member and discharging the liquid to the liquid controlled mechanism to control the same.

5. In a liquid treating apparatus, the combination with a tank for receiving liquid to be treated; piping for supplying liquid to be treated and having a constricted outlet discharging into the tank below its limiting level; a source of chemical in communication with said tank; liquid controlled mechanism for regulating the flow of chemical from said source to said tank; a stationary liquid conveying member having an inlet communicating with the tank upon the discharge side of said outlet; a liquid conveying member mounted to rise and fall and communicating with the first member through a passage that is above said inlet, there being sealed gas holding space in each member placed in communication with the gas holding space in the other by said passage, there also being an orifice, small in comparison to said outlet, through which controlling raw liquid is discharged into the second member; means controlled by the liquid in the first member and connected with the second member substantially fixed with respect to the liquid level in the first member; and a trap receiving liquid from the second member and discharging the liquid to the liquid controlled mechanism to control the same.

6. In a liquid treating apparatus, the combination with a tank for receiving liquid to be treated; piping for supplying liquid to be treated and having a constricted outlet discharging into the tank below its limiting level; a source of chemical in communication with said tank; liquid controlled mechanism for regulating the flow of chemical from said source to said tank; a stationary liquid conveying member having an inlet communicating with the tank upon the discharge side of said outlet; a liquid conveying member mounted to rise and fall and communicating with the first member through a passage that is above said inlet, there being sealed gas holding space in each member placed in communication with the gas holding space in the other by said passage, there also being an orifice, small in comparison to said outlet, through which controlling raw liquid is discharged into the second member; float mechanism controlled by the liquid in the first member and connected with the second member substantially fixed with respect to the liquid level in the first member; and a trap receiving liquid from the second member and discharging the liquid to the liquid controlled mechanism to control the same.

In witness whereof, I hereunto subscribe my name.

KENT W. BARTLETT.